US006638046B1

United States Patent
Gillen et al.

(10) Patent No.: US 6,638,046 B1
(45) Date of Patent: Oct. 28, 2003

(54) COMPACT MOLDING APPARATUS AND METHOD

(75) Inventors: John H. Gillen, Ottawa Lake, MI (US); Charles E. Ash, Perrysburg, OH (US); John M. Clark, Osseo, MI (US)

(73) Assignees: Libbey-Owens-Ford Co., Toledo, OH (US); Roll-Tech, Inc., Reading, MI (US)

( * ) Notice: Subject to any disclaimer, the term of this patent is extended or adjusted under 35 U.S.C. 154(b) by 0 days.

(21) Appl. No.: 09/452,790

(22) Filed: Dec. 2, 1999

Related U.S. Application Data

(60) Provisional application No. 60/111,467, filed on Dec. 9, 1998.

(51) Int. Cl.[7] .............................................. B29C 45/64
(52) U.S. Cl. ...................... 425/117; 425/190; 425/589; 425/593
(58) Field of Search .............................. 425/117, 125, 425/190, 593, 589, 451.6, 595

(56) References Cited

U.S. PATENT DOCUMENTS

| | | | |
|---|---|---|---|
| 3,577,591 A | 5/1971 | Ricards et al. | |
| 3,915,617 A | 10/1975 | Saladin | |
| 3,981,671 A * | 9/1976 | Edwards | 425/450.1 |
| 4,072,458 A * | 2/1978 | Schlieckmann | 425/451.6 |
| 4,269,587 A | 5/1981 | Tranter | |
| 4,354,819 A | 10/1982 | Wirz | |
| 4,561,625 A | 12/1985 | Weaver | |
| 4,584,155 A | 4/1986 | Zanella | |
| 4,688,752 A | 8/1987 | Barteck et al. | |
| 4,699,584 A * | 10/1987 | Kurita et al. | 425/450.1 |
| 4,708,625 A * | 11/1987 | Arend | 425/450.1 |
| 4,762,481 A | 8/1988 | Weaver | |
| 5,033,955 A * | 7/1991 | Faig et al. | 425/451.6 |
| 5,056,999 A * | 10/1991 | Lewis et al. | 425/593 |
| 5,061,429 A | 10/1991 | Yoshihara et al. | |
| 5,108,687 A | 4/1992 | Joyrquin et al. | |

* cited by examiner

*Primary Examiner*—James P. Mackey
(74) *Attorney, Agent, or Firm*—Marshall & Melhorn, LLC

(57) ABSTRACT

An apparatus for molding and a molding method utilizing a moveable mold platen which may hold, have affixed to, or carry a first portion of a mold or molds. A second or door platen may hold, have affixed to, or carry a second portion of a mold or molds. The door platen is placed in its closed position, and the moveable mold platen is brought up adjacent to it, so that the two portions of the mold are brought into engagement with one another. A desired molding material is injected into the mold cavity, after which the moveable platen is retracted, the door platen is opened, and the part is removed. A part to be encapsulated may be placed into the mold before the two portions of the mold are brought into engagement.

21 Claims, 8 Drawing Sheets

COMPACT MOLDING APPARATUS AND METHOD

This application is claiming the benefit, Under 35 U.S.C. §119 (e), of the provisional application filed on Dec. 9, 1998, under 35 U.S.C. §111(b), which was granted Ser. No. 60/111,467. The provisional application, No. 60/111,467 is hereby incorporated by reference.

BACKGROUND OF THE INVENTION

1. Field of the Invention

The present invention relates to an apparatus for molding, and a molding method.

2. Discussion of the Related Art

In the preferred embodiments of the present invention, the molding apparatus is used to hold mold(s) which encapsulate, or mold onto, glass or plastic sheets of the type which are commonly employed as glazing closures in present day vehicles such automobiles and the like. In addition to such glazing sheets being bent to precisely define curvatures dictated by the configuration and size of openings in the vehicle body, in order to meet strict quality standards of manufacturers, it is necessary to mold onto or encapsulate to the sheets of material items such as a gasket around a predetermined portion of the sheet of material. Items such as mounting brackets or studs may also be applied at the location of the gasket or at other positions on the surface of the sheet.

Encapsulating sheets of glass or plastic requires the use of a relatively large mold platen. In order to obtain a large platen, one must purchase a very large, high pressure, molding machine.

U.S. Pat. No. 4,561,625 discloses a mold structure for forming a polymeric gasket around a predetermined portion of a sheet of transparent material such as glass. The mold structure includes two cooperating mold sections for defining a chamber for receiving the transparent sheet. A seal is positioned about the periphery of the chamber and is utilized to resiliently support the sheet within the chamber. Also the seal cooperates with a predetermined portion of the transparent sheet for defining a gasket cavity having a configuration corresponding to the gasket to be formed on the sheet of transparent material.

U.S. Pat. No. 4,762,481 discloses a mold for forming a window assembly which includes a transparent glass sheet and gaskets formed by curing a polymeric gasket material in situ on the glass sheet to encapsulate a marginal peripheral edge portion thereof. A glass sheet to be utilized in a vehicle has a front edge, rear edge, and a lower edge to each of which is adhered such a gasket. In addition, a bracket means for attachment to a scissor linkage for raising and lowering the window can be secured to the lower edge of the window.

U.S. Pat. No. 4,584,155 discloses a method for molding surface structure onto the surface of a glass sheet.

U.S. Pat. No. 5,108,687 discloses a device for at least partially encapsulating a border of a substantially sheet shaped element. The device contains a cavity formed by an elastically deformable member having a profile which extends along an encapsulation border line of the element and which is adapted to be elastically deformed while maintaining a tight contact along the encapsulation border line when pressure is applied thereon in order to follow a irregularities in the element along the border line.

The co-pending application of applicant's assignee, Ser. No. 08/898,207, filed Jul. 22, 1997, and entitled "Molding Method and Apparatus and Parts Produced Thereby" shows a molding apparatus having a mold base and at least one moveable mold core rotatable into and out of a facing relationship with the mold base. When the moveable mold core is in its closed position, it cooperates with the mold base to define a mold cavity. The mold base may be shaped so as to aid in forming a part, or to hold a sheet of material onto which molding material is to be deposited so as to encapsulate the part on one or more edges or surface regions. Structure may be also encapsulated onto the surface of the material during the molding operation.

The above mentioned patents show various window assemblies and methods to make the same. The apparatus to make the devices shown often involve large and complicated molding presses. This often times necessitate the devices being made at a separate plant and shipped for installation, for example, to an automobile assembly plant, rather than being manufactured on site, or nearby.

Also, such machines are large and costly. Cost amortization requires that multiple molds are changed into, and out of, the machines to manufacture different parts. Due to this, such machines are compromised in size and performance. Thus, those skilled in the art continued to search for a compact molding apparatus which could be moved easily from one place to another, and held mold(s) in such a way that they were easily and quickly interchangeable.

SUMMARY OF THE INVENTION

The aforementioned problems are addressed in accordance with the present invention by the utilization of a novel apparatus and method not hereto found in the prior art. In its broadest form, the apparatus of the present invention may be used to hold almost any type of mold or molds to produce almost any part which is currently molded, and is easily moved to optimize the manufacturing cell.

In one embodiment of the invention, a moveable mold platen may hold, have affixed to, or carry a first portion of a mold or molds. A second or door platen may hold, have affixed to, or carry a second portion of a mold or molds. The door platen is placed in its closed position, and the moveable mold platen is brought up adjacent to it, so that the two portions of the mold are brought into engagement with one another.

In another embodiment of the present invention, a self-contained molding apparatus of the foregoing nature is provided.

Thus, one of the objects of the present invention is to provide a novel molding method and apparatus for molding a part.

Another object of the present invention is to provide a molding apparatus which is compact and easily moveable from place to place, as needed.

Another object of the present invention is to provide a lightweight, self-contained, molding apparatus which may produce a part at the site where it is needed, or sufficiently nearby, to essentially save the cost of shipping the manufactured parts to the site.

Further objects and advantages of the present invention will be apparent from the following description and appended claims, reference being made to the accompanying drawings forming a part of the specification, wherein like reference characters designate corresponding parts in the several views.

Figure 1:
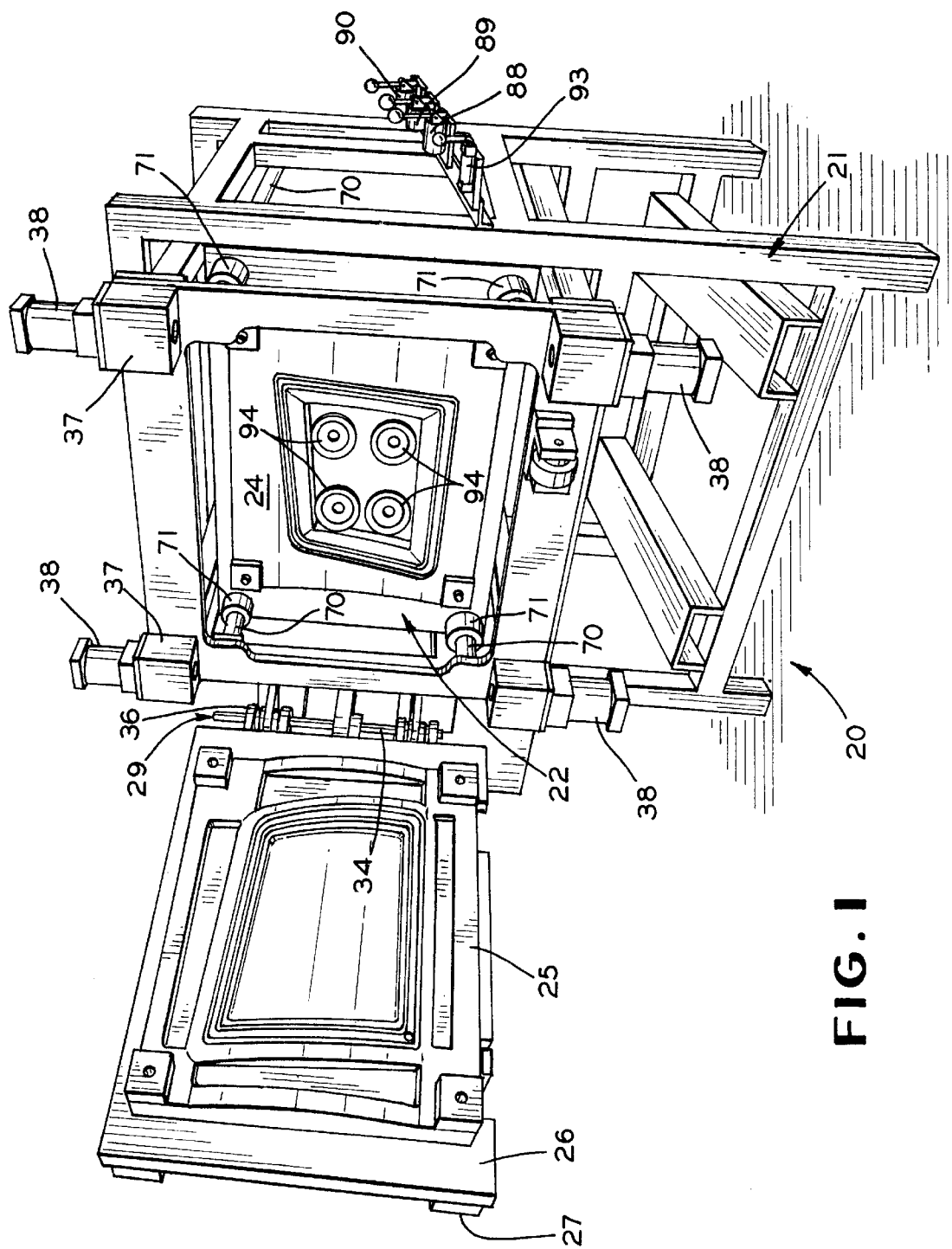
FIG. 1 is a perspective view of a construction embodying the present invention.

It is to be understood that the present invention is not limited in its application to the details of construction and arrangement of parts illustrated in the accompanying drawings, since the invention is capable of other embodiments, and being practiced or carried out in various ways within the scope of the claims. Also it is to be understood that the phraseology and terminology employed herein is for the purpose of description, and not of limitation.

DESCRIPTION OF THE PREFERRED EMBODIMENTS

There is shown a compact molding apparatus, generally designated by the numeral 20, which may be self contained. The molding apparatus includes a support or frame 21, generally of a parallelepiped nature, to which a moveable mold platen 22 is attached. A door platen 26 closes into position above the moveable mold platen 22. The moveable mold platen moves toward and away from the door platen 26. A mold or molds 23 are contained in the space defined by the retracted position of the moveable platen 22 and the closed position of the door platen 26. The mold(s) may extend laterally past the edges of the door platen 26 and the moveable mold platen 22 if desired. A portion of the mold(s) may be moveable with the door platen and/or moveable platen, depending on the particular application to which the improved method and apparatus of the present invention is applied.

The preferred embodiments of the present invention are described herein in connection with their use to encapsulate, or mold onto, a sheet of glazing material, such as a sheet S of glass. The molds 23 illustrated form no part of the present invention.

In one such use of the invention, the compact molding apparatus of the present invention is used to encapsulate at least a portion of a sheet of material, and includes a mold base attached to a moveable mold platen. Cooperating with the mold base is a mold core or cavity attached to a fixed or fixable mold platen, such as a door platen. Vacuum heads are provided in the mold base to hold a sheet of material in proper relationship thereto such that all or a portion of the sheet of material will be encapsulated when at least one mold core is positioned by said fixable or fixed mold platen in a mating or facing relationship with the mold base attached to said moveable mold platen, and molding material is introduced into the mold cavity formed by the mold base and the mold core or cavity.

In another such use of the present invention, the compact mold apparatus of the present invention has a moveable mold platen, and a door platen rotatable into an opposed or facing relationship with said moveable mold platen. A suitable mold base will be attached to said moveable mold platen and a suitable mold core or cavity will be attached to said door platen. A sheet of glass to be encapsulated will be interposed between the mold base and the mold core or cavity. The sheet of glass may be define and/or become part of the mold cavity. The portions of the glass surface and periphery on which a molding material will be deposited may be further defined by seal means. Provisions may be made in one or more of the mold base or the mold core or cavity to hold brackets, hinges or the like to be encapsulated either on the periphery or the surface of the sheet of material.

In another such use of the present invention, a glass sheet having had a ceramic enamel band previously applied thereto is placed into a mold base attached to said moveable mold platen and held in place by vacuum heads. A mold core or cavity is attached to the door platen. The door platen is closed or rotated into position so that facing surfaces of the mold base and the mold core or cavity are adjacent. The door platen is fixed in position by suitable means before the molding operation begins. The mold base is moved into position adjoining the mold core or cavity by the moveable mold platen. Polymeric or other molding material is introduced into the mold cavity defined thereby to encapsulate one or more edges of the sheet of glass. It should be understood that the mold base will include at least one of a mold core or mold cavity, and the other(s) of the mold core or cavity will be provided on the door platen.

Referring now to FIGS. 1–6, a first desired portion of a mold (or molds) 23, such as a mold base 24, may be attached to movable mold platen 22. A second desired portion of a mold (or molds) 23, which may be such as mold core or cavity 25, is fixedly attached to second or door platen 26, which is moveable into and out of a fixed position with relation to moveable mold platen 22 by first hinge means 29. First hinge means 29 will allow door platen 26 to swing open and shut when a powered actuator, such as first fluid cylinder 30, advances or retracts shaft 31. Shaft 31 is attached by yoke 32 to hinge arm 33. Hinge arm 33 is fixedly attached to hinge pin 34, while platen hinges 36, affixed to door platen 26, are free to rotate about hinge pin 34.

It should be understood that the term "stationary", when used to described the second or door platen 26, describes the position of the platen after the platen has been closed and the platen has been fixed in position. This occurs immediately before the moveable mold platen 22 advances the mold base 24 into an adjacent or engaging relationship with the mold core 25. In one of the preferred embodiments, the door platen 26 is shown in an opposed parallel relationship with the moveable mold platen 22. However, it can be understood that, depending on the application, the fixed position of the door platen 26, when closed, may be any desired stationary fixed position depending on the mold 23 being used, the shape of the part being molded, or other factors, and be well within the scope of the present invention.

The movable mold platen 22 is moved toward and away from the door platen 26 in an opposed, facing relationship. It can be understood that, while in the preferred embodiments, the door platen 26, and the movable platen 22, remain in a 180° opposed relationship, other relationships during movement are well within the scope of the present invention.

Figure 2:
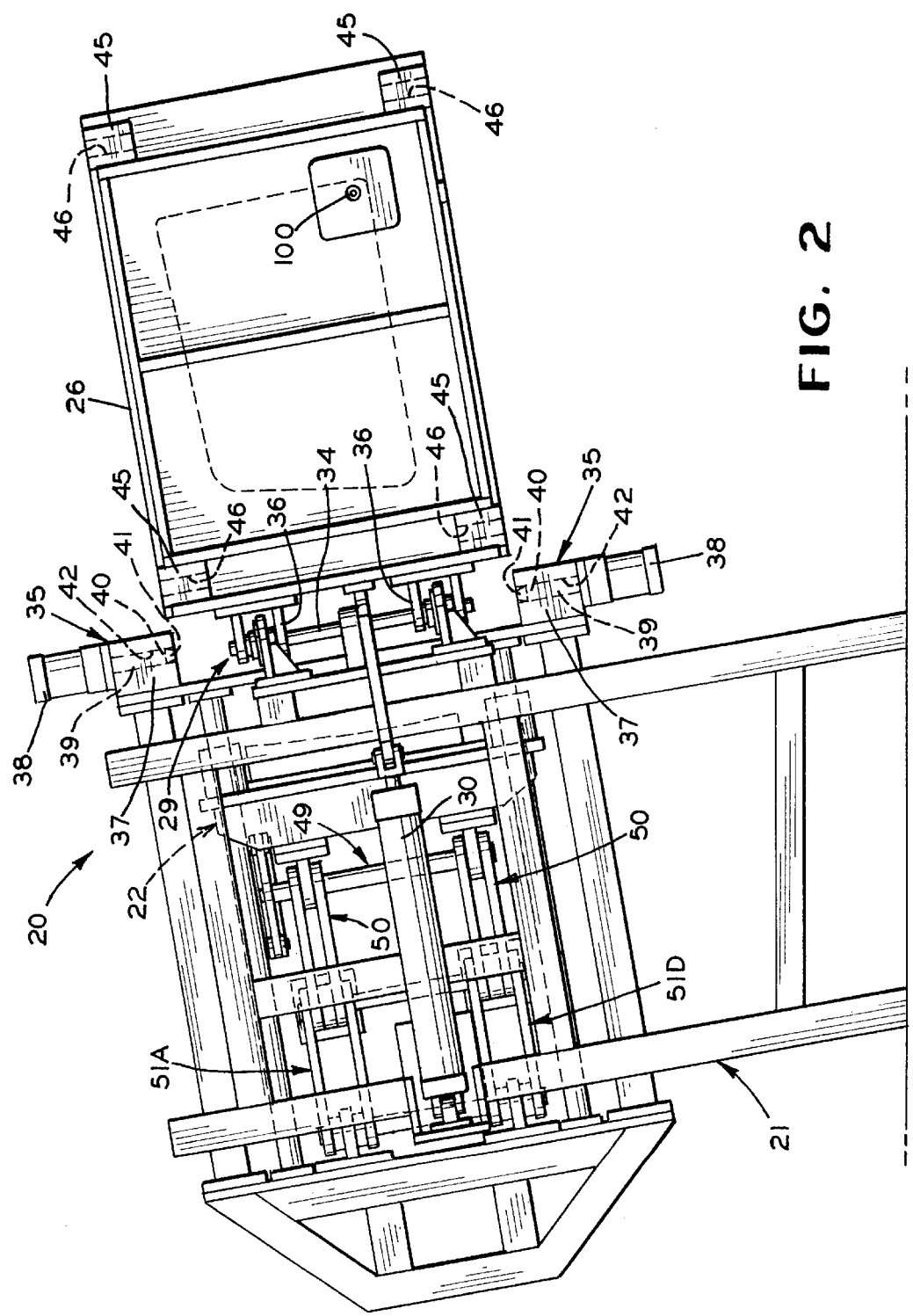
FIG. 2 is a side elevational view of the construction shown in FIG. 1.
Figure 3:
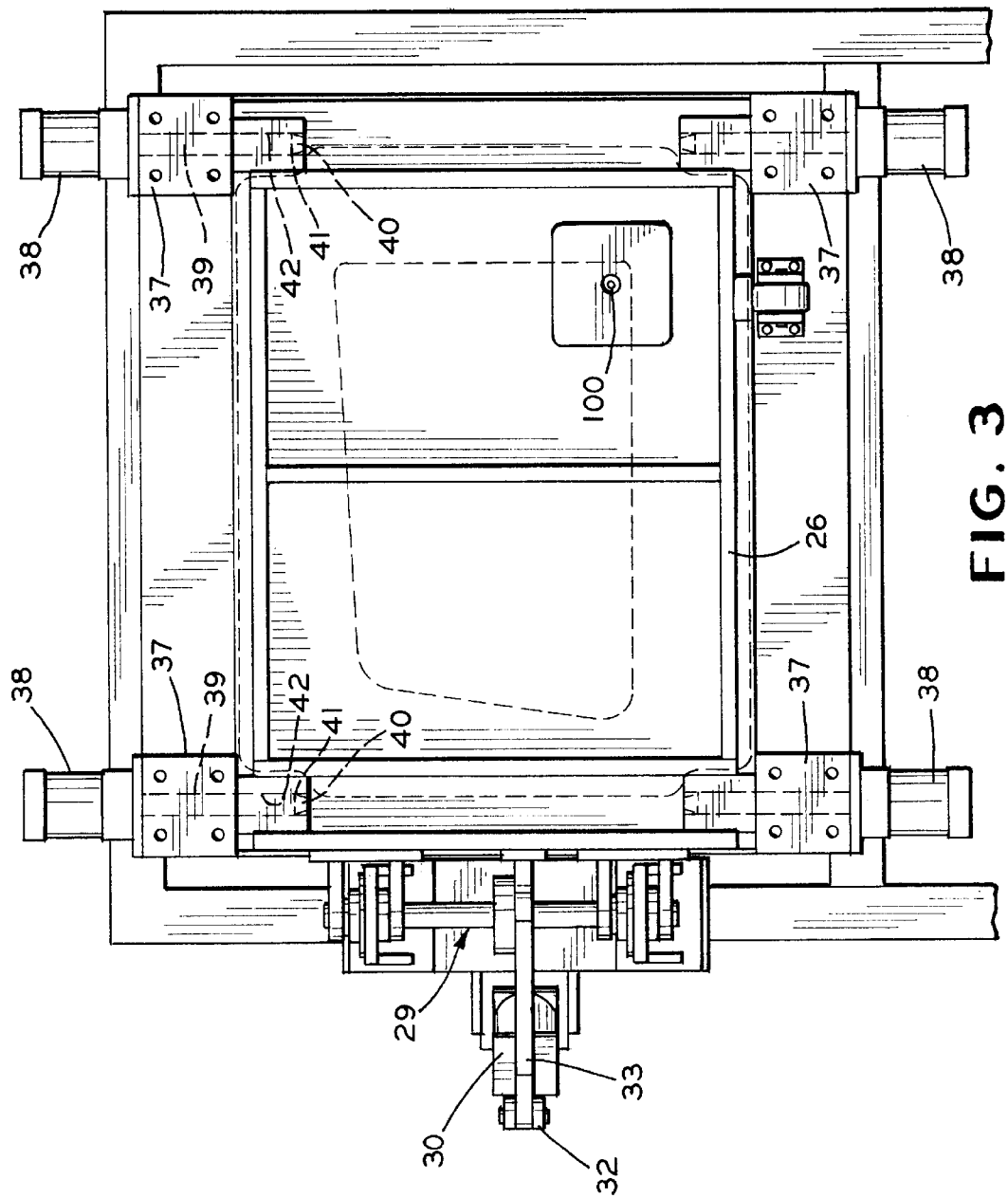
FIG. 3 is a front elevational view of the construction shown in FIG. 1.
Figure 4:
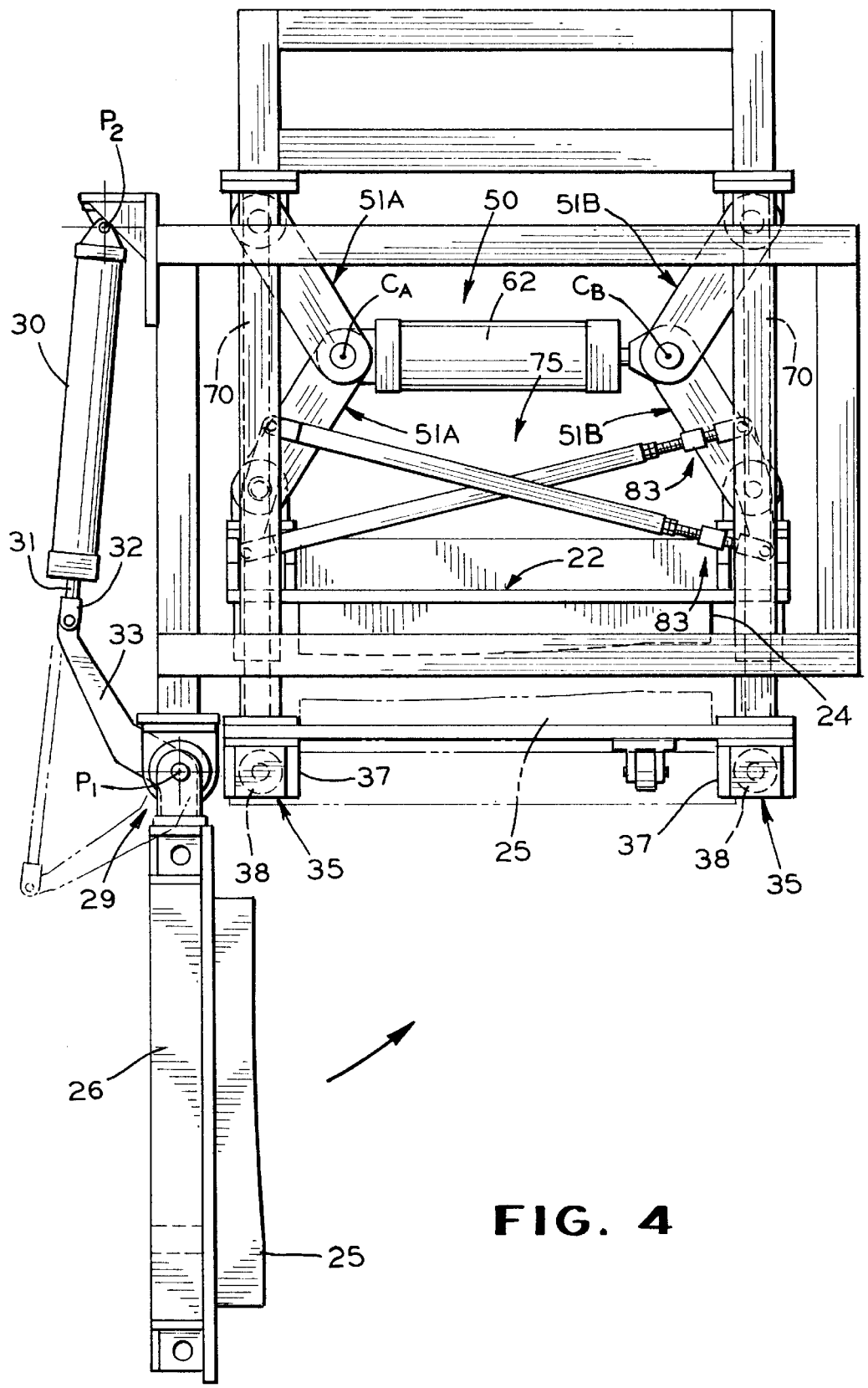
FIG. 4 is a top plan view of the construction shown in FIG. 1, showing the door platen in its open position.
Figure 5:
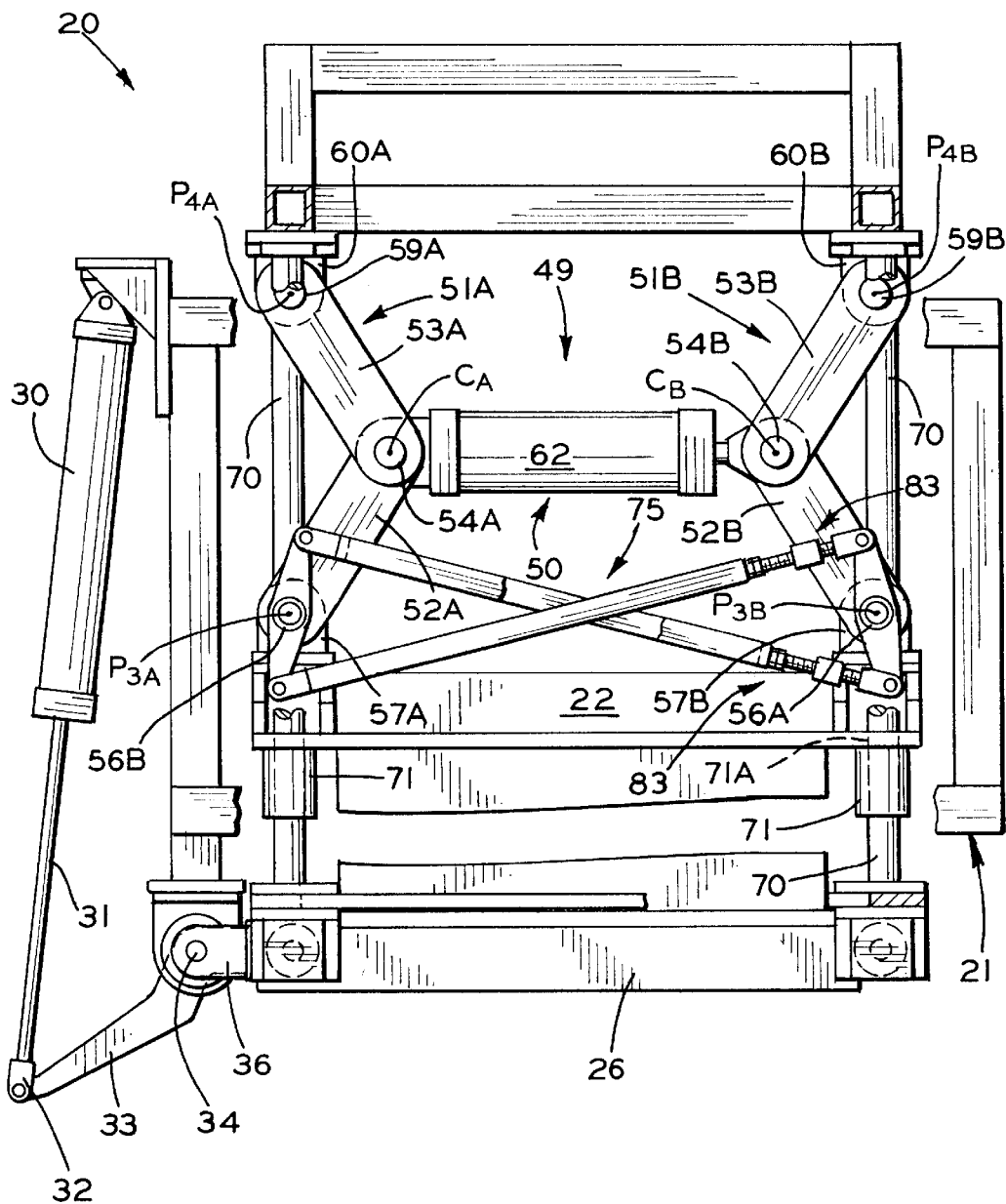
FIG. 5 is a view similar to that shown in FIG. 4 showing the door platen closed with mold core in a fixed facing relationship with the mold base before the moveable mold platen moves the mold base into a position adjacent said mold core.
Figure 6:
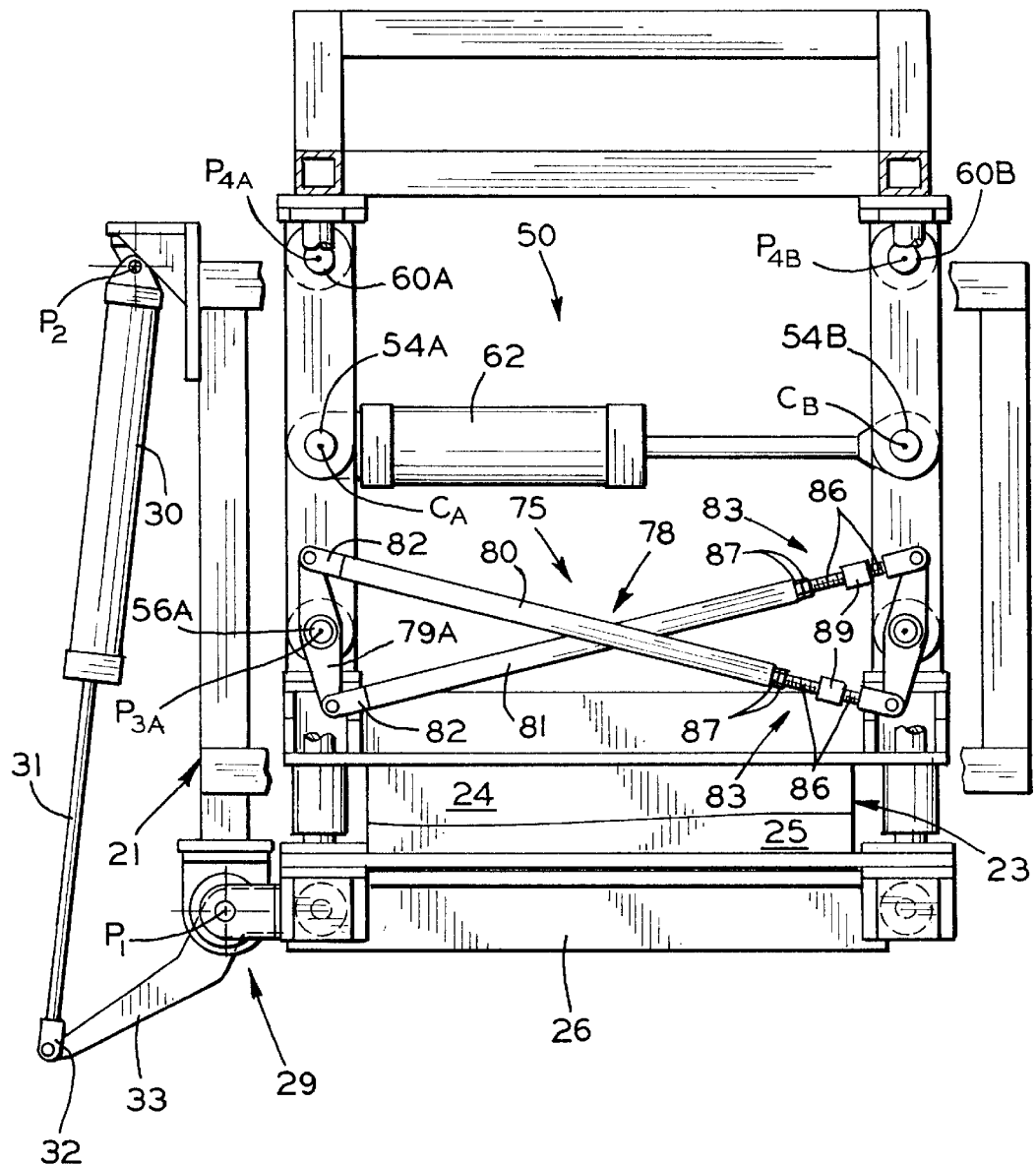
FIG. 6 is a view similar to FIG. 5, but showing the mold base and the mold core in their closed, or adjacent position.

Referring to FIGS. 5–6, the movement of the moveable platen 22 is accomplished by a reciprocating mechanism or means 49. As can be seen in FIGS. 2 and 4, two pairs of opposed toggle mechanisms 50 comprise the reciprocating mechanism or means 49. Each of said pair of opposed toggle mechanisms 50, in turn, comprise an opposed pair of toggle joints (51A,51B). Since each of said pair of opposed toggle joints (51A,51B) is substantially identical, only one need be described herein, and identical reference numerals (with appropriate suffixes) will be placed on the other of said pair of opposed toggle joints. It can also been understood that, depending on the application, other reciprocating means 50, well known in the art may be used.

Each toggle joint (51A,51B) has a first link (52A,52B) and a second link (53A,53B), which are connected at the center ($C_A$,$C_B$) by second shaft (54A,54B). First link (52A, 52B) is free to pivot about pivot point ($P_{3A}$,$P_{3B}$) which is on the center line of third shaft (56A,56B) carried in bearing block (57A,57B). Bearing block (57A,57B) is attached proximate one corner of movable platen 22.

Second link (53A,53B) is similarly free to pivot about pivot point ($P_{4a}$,$P_{4B}$) Pivot point ($P_{4al}$,$P_{4B}$) is on the center line of fourth shaft (59A,59B) carried by second bearing block (60A,60B). Second bearing block (60A,60B) is attached to frame 21 in a 180° opposed relationship to first bearing block (57A,57B).

A powered actuator, such as toggle fluid cylinder 62, is connected for operation between the center $C_A$ of the first of said pair of opposed toggle joints 51A, and the center $C_B$ of the second of said pair of opposed toggle joints 51B. Expansion and contraction of the toggle fluid cylinder 62 will cause the movable platen 22 to move between its open or retracted position, shown in FIG. 5, and its expanded or closed position, shown in FIG. 6. A ball screw may be used in place of the toggle fluid cylinder 62, if desired.

To insure that the movement of the moveable platen 22 toward and away from the door platen 26 is smooth, and in the desired direction, the movable platen 22 moves on a linear guide or plurality of elongate parallel rods, which may be such as tie bars 70. In the illustrated embodiment, four tie bars 70 are used. Each tie bar 70 is attached at both of its ends to the frame 21 in a manner such that each tie bar 70 is parallel to each, other, tie bar 70. Each tie bar 70 passes through a tie bar bearing 71 attached to said movable platen 22 proximate a corner thereof. Suitable openings 71A are placed in the moveable platen to permit the tie bars 70 to pass through.

To prevent twisting or jamming of the moveable platen 22 when the toggle fluid cylinder 62 operates, an anti-jamming mechanism 75 is provided. Best seen in FIG. 6, anti-jamming mechanism 75 is shown in the form of a cross-link mechanism 78. Other anti-jamming mechanisms may also be used. A rack and pinion anti-jamming mechanism is described hereinafter with respect to FIGS. 7–9.

To effectuate the cross link mechanism 78, a pair of double ended arms (79A,79B) are fixedly attached to third shafts (56A,56B). A first cross-link 80, and a second cross-link 81 connect double ended arms (79A,79B) as shown.

Each of said first and said second cross links are provided with a first threaded aperture (80A,81A) fixed yoke 82, and an adjustable yoke 83. Each adjustable yoke 83 includes a yoke portion 84 having a second threaded aperture 84A therein. Extending between each first threaded aperture (80A,81A) and each second threaded aperture 84A is a split threaded rod 86. A turnbuckle 89 connects the portions of the split rod 86. A pair of lock nuts 87 are provided on one portion of each split threaded rod 86 for purposes of holding it stationary, so that upon turnbuckle 89 being rotated, the effective length of first cross-link 80, and second cross-link 81 are equally lengthened or shortened depending upon the direction of rotation of the turnbuckle 89.

First cross link 80 is rotatably attached to one end of double ended arm 79A, and to the opposite end of double ended arm 79B. In a similar manner, second cross link 81 is rotatably attached to the other end of double ended arm 79A, and to the remaining end of double ended arm 79B. Any tendency for the toggle fluid cylinder 62 to expand unevenly and jam the movable platen 22 on the tie bars 70 will be opposed by forces acting through the first cross links 80 and the second cross link 82.

A suitable source of fluid power (not shown) will be provided to the compact molding apparatus 20 sufficient to operate the first fluid cylinder 30 the fluid cylinders 38 and the toggle fluid cylinders 62. Suitable conduits (not shown) also well known in the art will be used to connect this source of fluid power to the various controllers or control valves. First control valve 88 will be connected by suitable conduit (not shown) to first fluid cylinder 30. Operation of the first control valve 88 will cause the shaft 31 to advance or retract thus, opening or closing the door platen 26. Second control valve 89 may be used to operate the fluid cylinders 38 which fix the door platen into position after it has been closed. Third control valve 90 may control the advancement of the moveable platen 22 by operation of the toggle fluid cylinders 62. Suitable conduits will connect the third control valve to the toggle fluid cylinders 62. Vacuum control valve 92 will be connected to a source of vacuum, such as a vacuum pump, which is well known in the art. The control valve 93 will control the vacuum to the vacuum heads 94 shown as part of the mold base 24 in FIG. 1.

In operation a sheet of material S will be placed into position in the mold base 24 while the vacuum is being applied to the vacuum heads 94. First control valve 88 will be placed in an appropriate position by the operator of the compact molding apparatus 20 to cause the door platen to swing into its closed position. This will cause mold core or cavity 25 to come in to an opposed or facing relationship with mold base 24 mounted on moveable mold platen 22 as shown in FIG. 4. At this point the operator will release first control valve 88 and operate second control valve 89 which will cause the fluid cylinders 38 to advance moveable or powered shot pins or lock pins or shafts 39 which enter shaft or pin bearings 42 in door platen 26 to fix the door in position.

The operator will then release second control valve 89 and operate third control valve 90, which is connected to the toggle fluid cylinders 62. As previously described the operation of toggle fluid cylinders 62 will advance the moveable mold platen 22, and thus the mold base 24, toward the mold core or cavity 25 and bring them into an adjacent relationship. A desired molding material is conditioned and introduced into port 100 (FIG. 3) by means well known in the art. Port 100 is in fluid communication with mold core or cavity 25 and will encapsulate or mold onto the sheet of material S. Any practicable mold 23 may be used with the compact molding apparatus of the present invention to provide a wide variety of molded parts. It may be desired to heat or cool molds 23 by means well known in the art, and this is well within the scope of the present invention.

Figure 7:
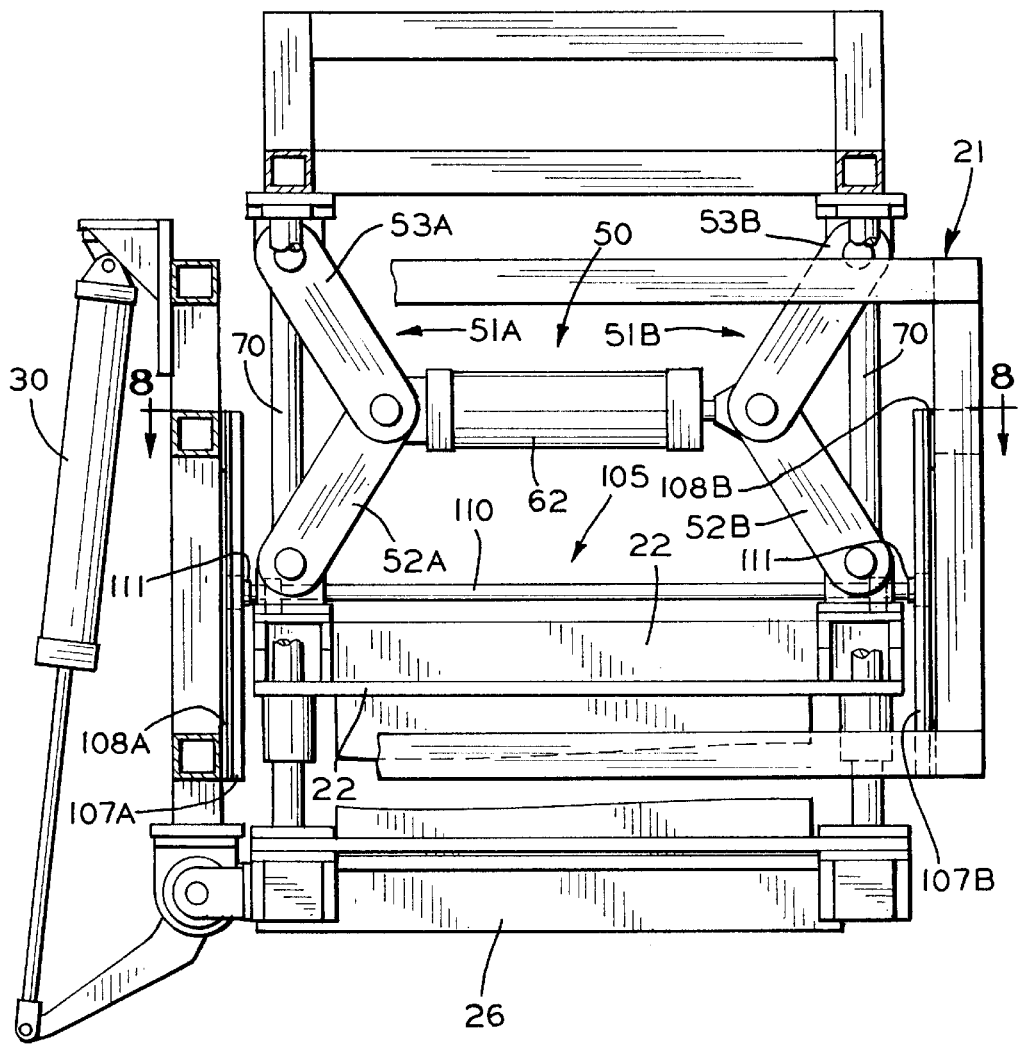
FIG. 7 is a top plan view, similar in part to FIG. 5, but showing a modification of the present invention.
Figure 8:
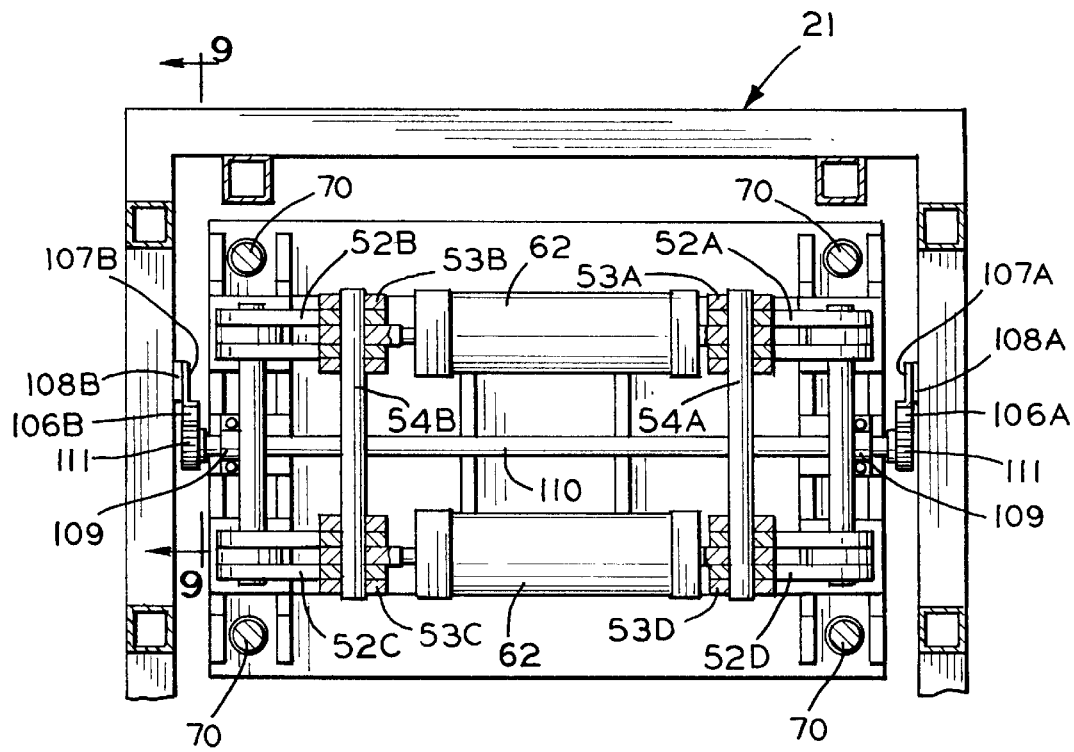
FIG. 8 is a sectional view, taken in the direction of the arrows, along the section line 8—8 of FIG. 7.
Figure 9:
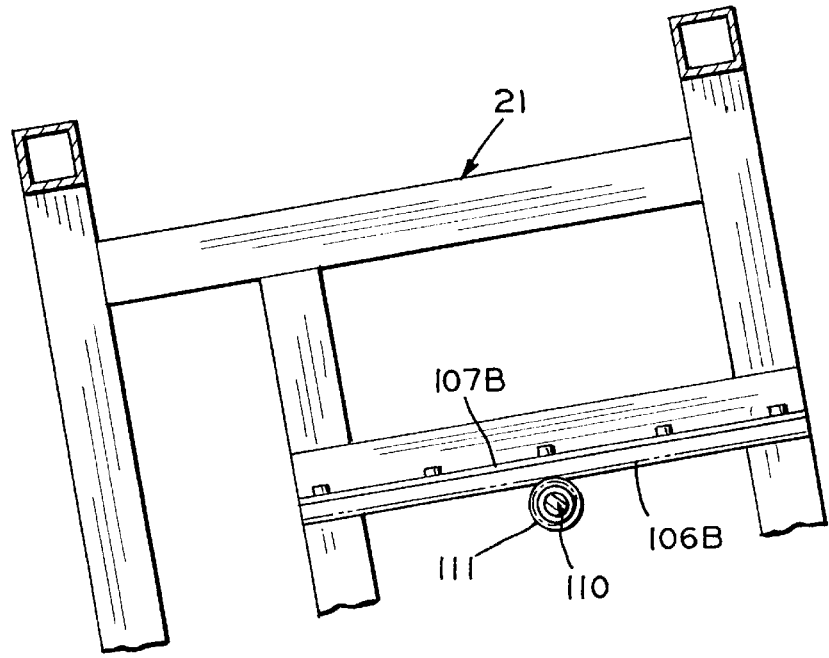
FIG. 9 is a sectional view, taken in the direction of the arrows, along the section line 9—9 of FIG. 8.

Referring now to FIGS. 7–9, there is shown a modification of the present invention wherein a rack and pinion arrangement is used as the anti-jamming mechanism or means 75 in place of the cross-link mechanism. Rack and pinion assembly 105 replaces cross-link mechanism 78.

Rack and pinion assembly 105 includes a pair of racks (106A,106B) mounted in a parallel, spaced, relationship to frame 21 with the aid of a pair of L-shaped supports (107A,107B). L-shaped supports (107A,107B) are mounted to spacers (108A,109B), which are, in turn fastened to frame 21.

A pair of bearing blocks (109A,109B) are mounted to the underside of moveable platen 22 in an axially aligned relationship to support shaft 110 for rotation. To each end of shaft 110 is mounted a pinion gear 111. Each pinion gear 111 preferably has an identical number of teeth, and engages its' respective rack (106A, 106B).

It can be seen that as movable platen 22 travels along tie bars 70, racks (106A,106B) engaging pinions 111 cause shaft 110 to rotate. As long as movable platen 22 is advancing or retracting evenly toward and away from the door platen 26, shaft 110 and pinions 111 just perform a follower motion. However, if moveable platen 22 tends to twist or move unevenly on the tie bars 70, the anti-jamming means 75, which includes racks (106A, 106B), L-shaped supports (107A,107B), spacers (108A,108B), bearing blocks 109, shaft 110 and pinions 111 will resist such motion.

Any attempt by moveable platen 22 to advance unevenly will tend to rotate one of said pinions 111 faster than the other of said pinions 111. Since both of said pinions are fixedly attached to shaft 110, this will tend to twist shaft 110. Since the force required to twist shaft 110 is more than the force required to resist the force of the toggle mechanisms 51A–D, the side of the moveable platen 22 which is attempting to overrun will be slowed down, allowing the other side to catch up, and a smooth and even motion to continue.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A compact molding apparatus comprising:
   a) a frame member,
   b) a moveable mold platen attached to said frame member for substantially reciprocal movement with regard to a fixable door platen in a closed position,
   c) means to move said movable platen, wherein said means to move said movable platen includes a powered actuator connected to said movable platen,
   d) a first portion of a mold attached to said moveable mold platen,
   e) said door platen hingedly mounted to said frame member and fixable in a fixed relationship with regard to said moveable platen when said moveable platen is in an advanced position,
   f) means to move said door platen, wherein said means to move said door platen includes a powered actuator connected to said door platen,
   g) a second portion of a mold attached to said fixable door platen, and
   h) means to control said means to move said movable mold platen and said means to move said fixable door platen,
   i) wherein direct access to said first mold portion is gained through a door opening that is defined in said frame member when said door platen is in the open position, and
   j) further, wherein said compact molding apparatus is movable from place to place, as needed.

2. The molding apparatus defined in claim 1, wherein:
said first portion of said mold and said second portion of said mold are contained in the space defined by said moveable platen in said advanced position and said door platen in said closed position.

3. The molding apparatus defined in claim 2, wherein:
said hingedly mounted door platen is rotatable between said open position and said closed position in a facing relationship with said moveable mold platen.

4. The molding apparatus defined in claim 3, wherein:
said first portion of a mold is a mold base attached to said moveable mold platen.

5. The molding apparatus defined in claim 4, wherein:
said second portion of a mold is a mold cavity attached to said door platen.

6. The molding apparatus defined in claim 5, and further including:
   a) at least one vacuum head provided in said mold base to hold a sheet of material in place during a molding operation, and
   b) a vacuum pump connected to said at least one vacuum head.

7. The molding apparatus defined in claim 5, and further including:
shot pins to fix said door platen in a fixed position.

8. The molding apparatus defined in claim 7, wherein said means to move said movable platen include:
a reciprocating mechanism.

9. The molding apparatus defined in claim 8, wherein said reciprocating mechanism include:
two pairs of opposed toggle mechanisms.

10. The molding apparatus defined in claim 9, wherein each of said two pairs of opposed toggle mechanisms include:
an opposed pair of toggle joints.

11. The molding apparatus defined in claim 10, wherein each of said opposed pair of toggle joints comprise:
   a) a first bearing block having a first bearing block shaft, said first bearing block being attached proximate to one corner of said movable platen,
   b) a second bearing block having a second bearing block shaft, said second bearing block being attached to said frame member, said second bearing block being in an opposed relationship to said first bearing block,
   c) a first link being free at one of its ends to pivot about said first bearing block shaft, and
   d) a second link being free at one of its ends to pivot about said second bearing block shaft, the other end of said first link and said second link being connected together for rotation by a link shaft.

12. The molding apparatus defined in claim 11, and further including:
   a) a toggle fluid cylinder connected between said link shaft connecting said first link and said second link of each of said pair of opposed toggle joints,
   b) control valves connected to each of said toggle fluid cylinders, and
   c) means to control said control valves to move each of said toggle fluid cylinders.

13. The molding apparatus defined in claim 11, and further including:
   a) a ball screw connected between said link shaft connecting said first link and said second link of each of said pair of opposed toggle joints, b) control valves connected to each of said ball screws, and c) means to control said control valves to move each of said ball screws.

14. The molding apparatus defined in claim 12, wherein said means to move said moveable platen further include:

a) a plurality of tie bars attached to said frame member in a parallel spaced relationship, b) an equal plurality of tie bar bearings mounted to said moveable platen and slidably engaging said ties bars to provide for movement of said moveable platen back and forth along said tie bars.

15. The molding apparatus defined in claim 14, wherein said means to move said moveable platen further include an anti-jamming mechanism.

16. The molding apparatus defined in claim 15, wherein said powered actuator connected to said door platen comprises:

a) a first hinge means connected to said frame member to allow said door platen to rotate between said open and said closed position, said first hinge means including a hinge arm, and b) a fluid cylinder having a reciprocating shaft, said reciprocating shaft connected to said hinge arm, and said fluid cylinder pivotally connected to said frame member.

17. The molding apparatus defined in claim 16, wherein said powered actuator connected to said door platen to move said door platen into said closed position comprises:

a) a plurality of fluid cylinders having reciprocally moveable shafts mounted to said frame member proximate the corners of said door platen when said door platen is in said closed position, b) an equal plurality of shaft bearings mounted to said door platen to accept said reciprocally moveable shafts when said shafts are in their extended positions, and c) means to operate said fluid cylinders as desired to cause the shafts thereof to engage said shaft bearings and move said door platen into its closed position.

18. The molding apparatus defined in claim 15, wherein said anti-jamrning mechanism is a cross-link anti-jamming mechanism.

19. The molding apparatus defined in claim 15, wherein said anti-jamming means is a rack and pinion anti-jamming mechanism.

20. The molding apparatus of claim 15, wherein said anti jamming mechanism comprises:

means to control expansion and contraction of the toggle fluid cylinder to ensure even movement of each end of said toggle fluid cylinder in relation to the movement of said movable platen.

21. A mold apparatus comprising:

a frame member;

a door platen hingedly mounted on said frame member;

a movable platen movably mounted on said frame member between a first position spaced from said door platen and a second position adjacent said door platen;

a first toggle linkage joining said movable platen to said frame member, said toggle linkage comprising first and second links pivotally connected at a first toggle joint, said first link being pivotally connected to said movable platen and said second link being pivotally connected to said frame member;

a second toggle linkage substantially identical to said first toggle linkage and joining said movable platen to said frame member, said second toggle linkage comprising third and fourth links pivotally connected at a second toggle joint said third link being pivotally connected to said movable platen and said fourth link being pivotally connected to said frame member, a cylinder connected to said second toggle joint and extending between said first and second toggle joints;

said cylinder connected to said toggle joints, which can be extended to press against said toggle joints and thereby straighten said toggle linkage, and force said movable platen and a mold half mounted thereon into engagement with a mold half mounted on said door platen, when said door platen is closed, and contracted to collapse said toggle linkage and move said moveable platen away from said door platen;

an elongate shaft having a pair of spaced-apart pinion gears rotatably mounted to a selected one of said frame member and said movable platen; and a pair of rack gears meshing with said pinion gears, said rack gears mounted to the other of said frame member and said movable platen to form an anti-jamming mechanism.

* * * * *